(12) United States Patent
Smith et al.

(10) Patent No.: US 10,819,691 B2
(45) Date of Patent: Oct. 27, 2020

(54) SECURE EXPANDABLE ADVERTISEMENTS USING AN API AND CROSS-DOMAIN COMMUNICATIONS

(71) Applicant: PayPal, Inc., San Jose, CA (US)

(72) Inventors: Francis Smith, San Jose, CA (US); Saji Joseph, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/162,213

(22) Filed: Oct. 16, 2018

(65) Prior Publication Data

US 2019/0199699 A1  Jun. 27, 2019

Related U.S. Application Data

(63) Continuation of application No. 13/867,630, filed on Apr. 22, 2013, now Pat. No. 10,104,052, which is a continuation of application No. 12/716,022, filed on Mar. 2, 2010, now Pat. No. 8,452,710.

(60) Provisional application No. 61/291,792, filed on Dec. 31, 2009.

(51) Int. Cl.
| G06Q 20/38 | (2012.01) |
| H04L 29/06 | (2006.01) |
| G06F 16/95 | (2019.01) |
| G06F 21/00 | (2013.01) |
| G06Q 10/00 | (2012.01) |
| G06Q 30/02 | (2012.01) |
| H04L 29/08 | (2006.01) |

(52) U.S. Cl.
CPC .............. *H04L 63/08* (2013.01); *G06F 16/95* (2019.01); *G06F 21/00* (2013.01); *G06Q 10/00* (2013.01); *G06Q 30/0241* (2013.01); *H04L 29/06* (2013.01); *H04L 67/02* (2013.01)

(58) Field of Classification Search
CPC .................................................. G06Q 30/0241
USPC ....................................................... 705/50, 75
See application file for complete search history.

(56) References Cited

U.S. PATENT DOCUMENTS

| 2009/0299862 A1* | 12/2009 | Fan | G06Q 30/0277 705/14.73 |
|---|---|---|---|
| 2009/0327869 A1* | 12/2009 | Fan | G06Q 30/02 715/240 |
| 2010/0192058 A1* | 7/2010 | Rountree | G06Q 30/02 715/246 |
| 2011/0166917 A1* | 7/2011 | Shang | G06Q 30/02 705/14.7 |
| 2013/0019296 A1* | 1/2013 | Brandenburg | G06Q 30/0267 726/7 |

* cited by examiner

*Primary Examiner* — Chinedu C Agwumezie
(74) *Attorney, Agent, or Firm* — Kowert, Hood, Munyon, Rankin & Goetzel, P.C.

(57) ABSTRACT

A system to present secure expandable advertisements using an API and cross-domain communication. A content publishing system that hosts a website can implement an expandable advertisement using IFRAMEs that are expanded upon receiving an API call from a third party rich media vendor that hosts the expandable advertisement when the content publishing system and the third party media vendor are of differing domains.

20 Claims, 7 Drawing Sheets

SECURE EXPANDABLE ADVERTISEMENTS USING AN API AND CROSS-DOMAIN COMMUNICATIONS

CROSS-REFERENCE TO RELATED APPLICATIONS

This application is a continuation of U.S. patent application Ser. No. 13/867,630, filed on Apr. 22, 2013, now U.S. Pat. No. 10,104,052, issued on Oct. 16, 2018; which is a continuation of U.S. patent application Ser. No. 12/716,022, filed on Mar. 2, 2010, now U.S. Pat. No. 8,452,710, issued on May 28, 2013; which claims the benefit of U.S. Patent Application Ser. No. 61/291,792, filed on Dec. 31, 2009; the disclosures of all of these applications and patents are incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that forma part of this document: Copyright 2010, eBay Inc., All Rights Reserved.

TECHNICAL FIELD

Various embodiments relate generally to the field of online advertising, and in particular, but not by way of limitation, to methods and systems enabling the display of secure expandable advertising using an application programming interface ("API") and cross-domain communications.

BACKGROUND

Online advertisements generate the revenue supporting many content publishers. Rich media advertising, advertising beyond static text advertisements, represents a key and growing segment in the online advertising market. Industry analysts estimate that spending on rich media advertising in the United States will increase 400% to $5.1 billion USD in 2013, while spending on traditional non-rich static text ads will decrease by 22% in the same period. Similarly, analysts estimate that by 2012 more than half of European advertisement spending will purchase rich media advertisements, while traditional non-rich static text ads will decrease to just 15% of advertising spending.

The expandable advertisement, an advertisement that possesses the ability to expand and collapse its viewable area as triggered by predefined events, has emerged as a popular form of rich media advertising. Current implementations of expandable advertisements expose the content publishers' computer systems to security risks and may not be scalable. Implementation techniques commonly include utilizing "frame buster" javascript files to allow cross domain communication between a parent page and an IFRAME page of different domains.

BRIEF DESCRIPTION OF THE DRAWINGS

Some embodiments are illustrated by way of example and not limitation in the figures of the accompanying drawings in which.

DETAILED DESCRIPTION

Example methods and systems for supporting secure expandable advertisements using an API and cross-domain communications are described. In the following description, for purposes of explanation, numerous specific details are set forth in order to provide a thorough understanding of some example embodiments. It will be evident, however, to one skilled in the art that the present invention may be practiced without these specific details. As used herein, the term "or" may be construed in an inclusive and exclusive sense.

Rich media advertising includes advertising beyond static text advertisements, such as, but not limited to, banners, videos, images, animation, advertisements displaying dynamic motion or changes in appearance over time and other interactive media. A popularly instantiated type of rich media advertisement is the expandable advertisement. An expandable advertisement may be any advertisement that possesses the ability to expand and collapse its viewable area as caused by predefined trigger events. In an example embodiment of an expandable advertisement, a banner advertisement can expand from its original size to encompass any amount of the viewable area or collapse back to the original dimensions of a standard banner advertisement.

Implementing expandable advertisements introduces technical challenges to content publishers which often present both the content that attract the attention of advertising audiences and the expandable advertisement. One challenge is the technical implementation of how to securely present the expandable advertisement in a manner that permits expansion and collapse of the viewable area. Another challenge is how to securely implement the logic that enables the expansion or collapse of the expandable advertisement. Security issues may arise because of where the logic controlling the expandable advertisement is located. If the expandable advertisement logic is located with a third party, then the webpage host referencing the expandable advertisement has no control over the advertisement and its logic, which may put a webpage viewer at risk. If the expandable advertisement logic is stored with the webpage host, then the webpage host must inspect each piece of logic and may expose its own systems to risk. In one example embodiment, the first challenge is addressed by locating the expandable advertisement in an IFRAME element of the parent page. An IFRAME, or inline frame, enables embedding of another HTML document within the framework of an existing HTML document structure. This implementation may provide a layer of security, as modern browsers restrict an HTML document within an IFRAME from accessing data presented on the parent page or from communicating with the parent page when the IFRAME HTML document and parent page are of different domains. In an example embodiment, the IFRAME embeds an HTML document hosted on the content provider domain that references advertising content hosted on a third party rich media vendor domain. In another embodiment, the IFRAME embeds an HTML document hosted on a third party rich media vendor domain, which also hosts referenced content.

Because cross domain communication between a parent HTML document and the embedded document of an IFRAME of the parent HTML document cannot occur directly, prior art solutions addressing the second problem utilize a variety of methods, including referencing a "frame buster" file that serves as an intermediary. The "frame buster" file, which may be javascript, an executable or a set of instructions, recognizes triggering events, which may be events that occur on the content publisher's page or sensed by an expandable advertisement, and triggers expansion of the expandable advertisement. In a prior art solution, the content publisher hosts the "frame buster" file, which may be created by the third party rich media vendor. However, hosting the "frame buster" file, and potentially other third party files, could introduce the content publisher to security risks. Maintaining proper system security may demand inspection of each submitted third party file and may result in a non-scalable solution. In another prior art solution, the third party vendor hosts the "frame buster" file, and potentially all the rich media content files. This prior art solution provides the third party vendor control over when to expand or collapse the rich media advertisement. This solution potentially mitigates the scalability issues mentioned above, but may expose the content publisher website to an unchecked "frame buster" file that could expose visitors to the content publisher's site to malware, unknown inspection of their cookies or other intrusive actions. This solution may also expose sensitive information of the parent page and complicate usage tracking for the content publisher.

In one embodiment, advertisements can be expanded securely by presenting a webpage with an IFRAME that contains an HTML document that references a content piece, such as an advertisement, hosted on a third party domain and expanding the displayable area of the content piece upon receiving an API call from the third party. Because the advertisement is expanded upon an API call, no third party logic to expand the advertisement needs to be hosted with the content publisher website. In addition, the content publisher website and visitors to the content publisher's website are not exposed to logic hosted by the third party vendor. Therefore, by expanding the advertisement IFRAME by an API call mitigates potential security risks.

Figure 1:
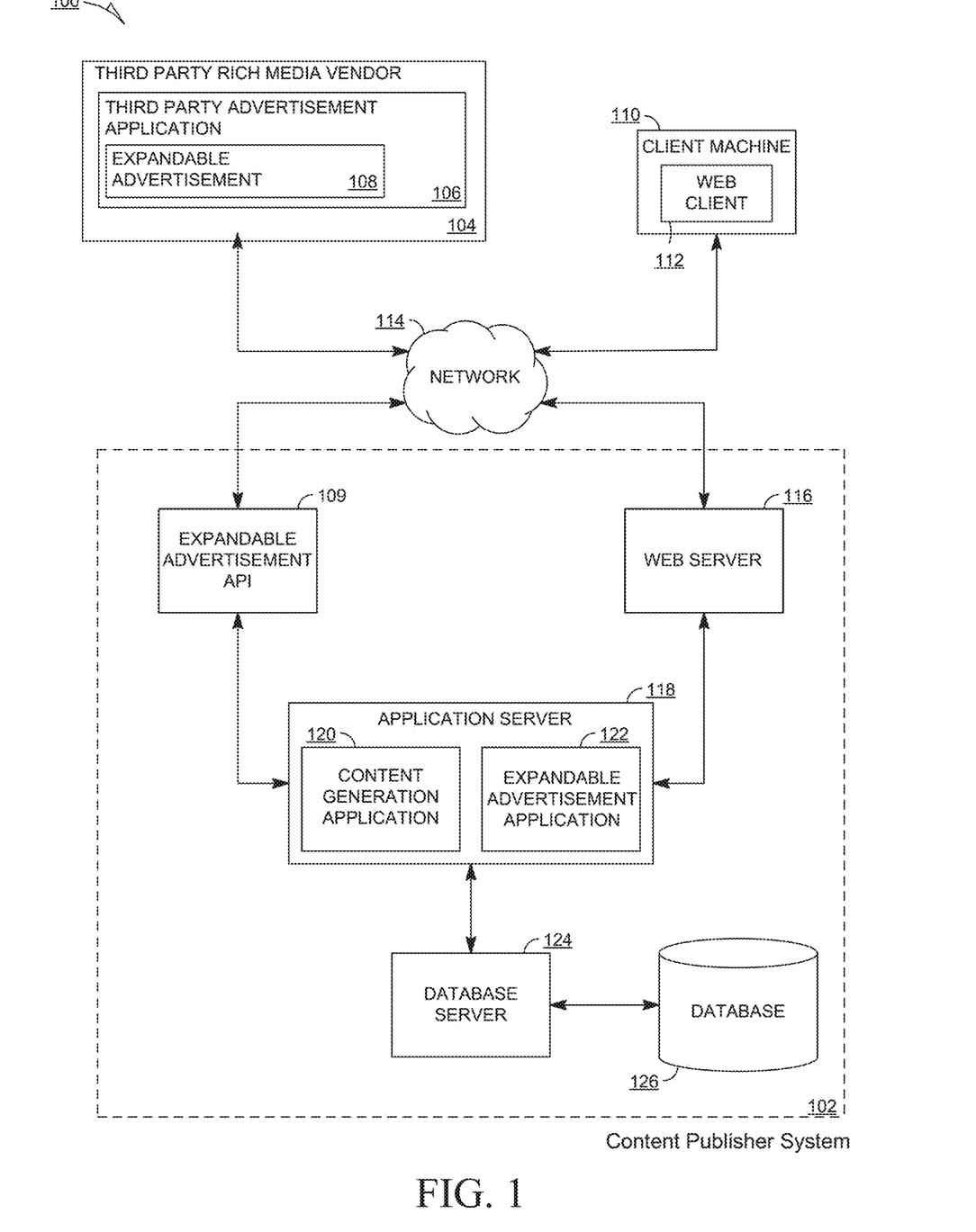
FIG. 1 is a block diagram of a system for displaying expandable advertisements, according to an example embodiment.

FIG. 1 is a block diagram of a system for displaying expandable advertisements, according to an example embodiment. The system for displaying expandable advertisements 100 contains a content publisher system 102. The content publisher system 102 hosts and presents publisher content and implements the infrastructure that supports the presentation of content from a third party rich media vendor 104. The third party rich media vendor 104 hosts an third party advertisement application 106 that manages access to an expandable advertisement 108. The third party advertisement application 106 may be a collection of applications, each implementing a functionality supporting the third party rich media vendor's 104 expandable advertisement 108. In an example embodiment, the content publisher system 102 may be an application server supporting a website with an IFRAME that contains an expandable advertisement 108.

A client machine 110 may be, but is not limited to, a personal computer, cell phone, mobile device or machine capable of launching a web client 112. A web client 112 may be, but is not limited to, Microsoft Internet Explorer®, Safari®, or a graphical web browser. The client machine 110 runs a web client 112 which may access the publisher content and the third party expandable advertisement 108 through a network 114, such as a communications network as embodied by the internet, and then present the accessed content through the web client 112.

The content publisher system 102 distributes content through a web server 116. The web server 116 accesses an application server 118, such as, but not limited to, an Apache application Server®. The application server 118 hosts various applications that control and prepare the presentation of data, including, but not limited to, a content generation application 120 and an expandable advertisement application 122.

The content generation application 120 assists in the presentation of publisher content. The content generation application 120 accesses a database server 124 that queries a database 126 to extract content and provide it to the web server 116. Content gathered from the web server 116 and the third party advertisement application 106 are communicated to the client machine's 110 web client 112 to render a web page containing the expandable advertisement 108 and publisher content. In an example embodiment, the content generation application 120 communicates and presents data accessed from the database server 124 and the database 126 to the web server 116 in the form of an HTML document. The HTML document may contain an IFRAME which itself contains an HTML document referencing data accessed through the third party advertisement application 106. In an example embodiment, the publisher content system 102 and the third party rich media vendor 104 reside on different domains.

The expandable rich media advertisement 108 presented by the web client 112 is expanded or collapsed by calls to an expandable advertisement API 109 of the content publisher system 102. Calls to the expandable advertisement API 109 are made by the third party advertisement application 106 and transmitted through the network 114, which causes the application server 118 to invoke functionality of an expandable advertisement application 122. The expandable advertisement application 122 expands or collapses the expandable rich media advertisement 108 presented on the web client 112. This may be accomplished by the expandable advertisement application 122 communicating with the web client 112 to expand an IFRAME. In an example embodiment, the call to the expandable advertisement API 109 includes parameter arguments, such as dimensions and identification information, which are passed to the expandable advertisement application 122 as input. In an example embodiment, the call to the expandable advertisement API 109 results in the expansion or collapse of the expandable advertisement 108 displayed at the web client 112, which can be achieved by, for example, acting as an intermediary between the parent page and the expandable advertisement domains to communicate with the parent page domain to resize the IFRAME containing the expandable advertisement, re-rendering of the main page, using third party software such as Adobe Flash or by exposing previously hidden elements.

A content publisher hosting the expandable advertisement API 109 may distribute API specifications to enable third parties, such as an advertising network, advertising agency or rich media vendor 104, to properly make calls to the expandable advertisement API 109. In an example embodiment, the content publisher system 102 may capture, share and decide upon ancillary data relating to the third party advertisement campaign and the expandable advertisement 108, such as the type of content provided, the dimensions and direction in which to expand the expandable rich media advertisement 108 and other configuration preferences, such as whether expansion is enabled and whether it should be expanded upon loading. Such ancillary information may be stored in the database 126 and utilized by the expandable advertisement application 120 to verify a call to the API server 109 or to control the expansion or collapse of an advertisement. For example, a call may be made to the expandable advertisement API 108 with arguments detailing the direction and dimension in which to expand an advertisement. The arguments may be compared against ancillary data defining the permissible directions and dimensions in which the advertisement may be expanded. If the arguments are compatible with the ancillary data, the advertisement may then be expanded according to the provided directions and dimensions.

TABLE 1

IAB Guidelines for Rich Media Expandables

| Format Category | Expandable Ads |
|---|---|
| Format (W × H) | User-initiated Expandable Ads: See IAB Ad Unit Guidelines. Landing Spots: Maximum width of 2X the initial ad size* |
| Max Initial Load File Size * | 40 KB |
| Add'l File Weight (Polite Download) | 80 KB |
| Flash Specifics | 18 fps |
| Audio Initiation | User Initiated (on click) |
| Maximum Animation Length | Anything up to 15 seconds |
| Controls | Control = "Close X" Font = 16 pt Location = On Edge of Original (non-expanded/expanded) unit Feature = Enable Mouse-Off Retraction |
| Web Site Labeling & Other Items | Label = "Advertisement" Font = 16 pt |

In one embodiment, the specifications related to the operation and presentation of the expandable advertisement 108 may adhere to Interactive Advertising Bureau ("IAB") guidelines as exemplified in Table 1. Parameters and ancillary information may describe expandable advertisement controls, the triggering event, the trigged action, visual effects such as color and font, and other parameters as permitted by IAB guidelines.

A content publisher system 102 serving rich media expandable advertisement may utilize targeting, tracking and reporting services. In an example embodiment, tracking may include recording advertisement data on the level of a campaign, placement or message. Tracking metrics may include recording the number of advertisements served, the number of advertisements expanded, the number of advertisements collapsed, each incident of violation with the URL or other data accessible to the expandable advertisement API 109.

Figure 2A:
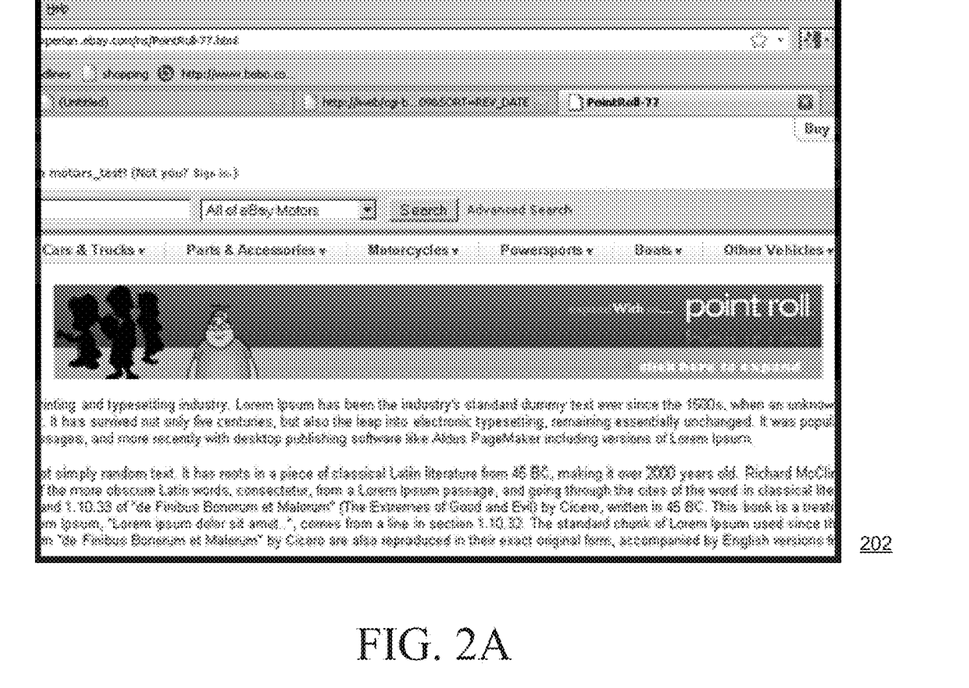
FIG. 2A is screenshot of a website with an advertisement banner in a collapsed form.
Figure 2B:
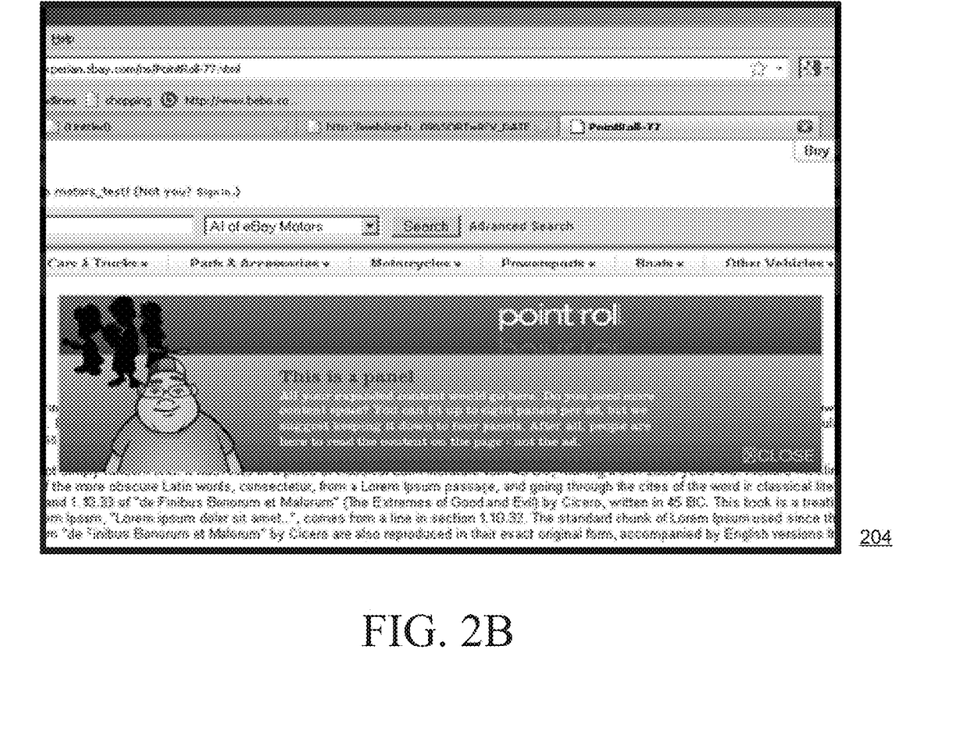
FIG. 2B is a screenshot of a website with an advertisement banner in an expanded form.

FIG. 2A is a screenshot of a website with an advertisement banner in a collapsed form 202. FIG. 2B is a screenshot of a website with an advertisement banner in an expanded form 204, as represented by expanding the advertisement banner of 202. In an example embodiment, a mouse click on the banner, movement of the mouse over the banner, or some other trigger event causes the collapsed banner 202 to expand into the expanded banner 204. Additionally, a second mouse click on the banner, movement of the mouse over the banner or other trigger event may collapse the expanded banner 204 to the collapsed banner 202.

Figure 3:
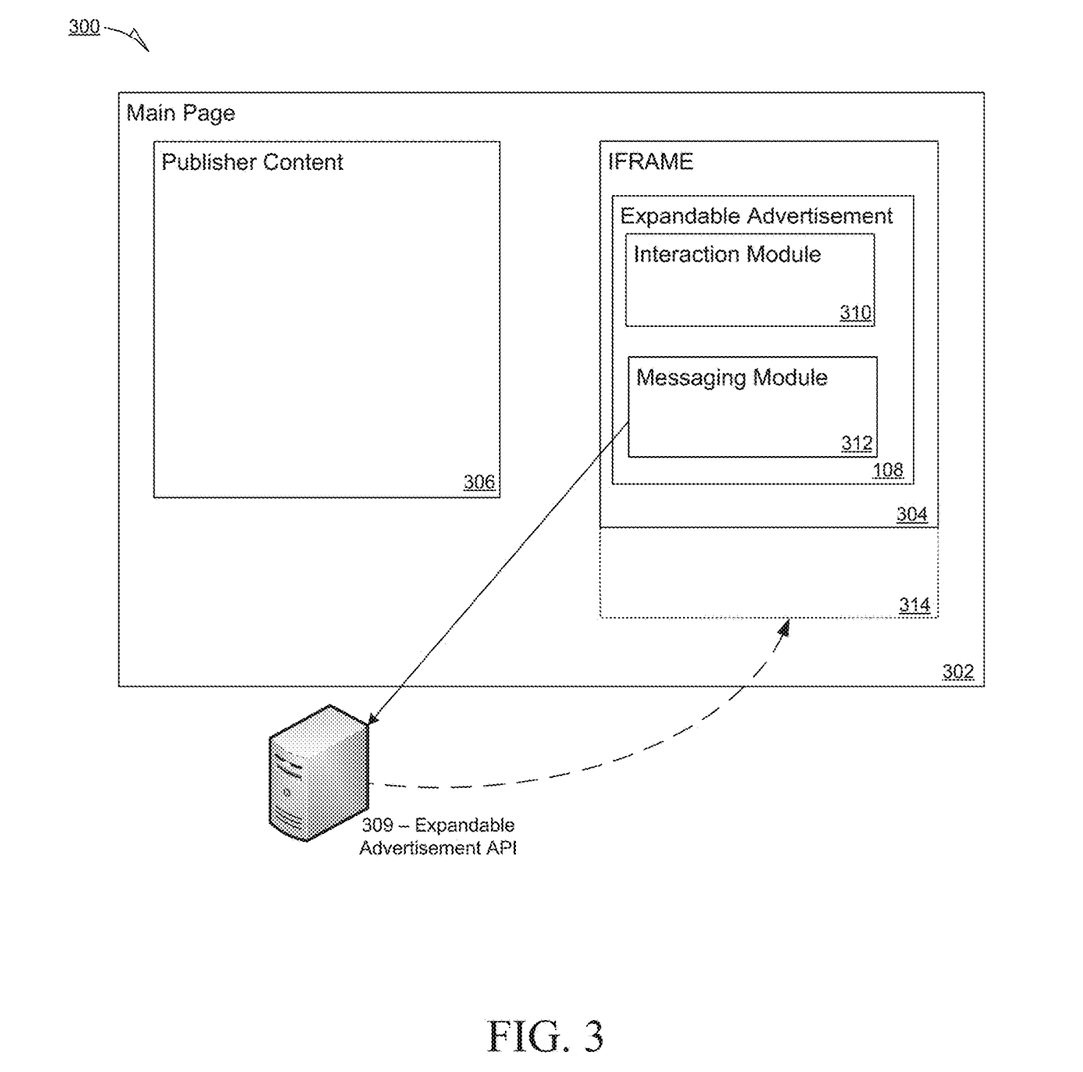
FIG. 3 is a block diagram of the components of a website with an expandable advertisement and the supporting back-end business modules, according to an example embodiment.

FIG. 3 is a block diagram 300 of the components of a website with an expandable advertisement and the supporting backend business modules, according to an example embodiment. The main page 302 is the parent HTML document presented to the web client 112. The main page 302 comprises of publisher content 306, such as, but not limited to, articles, images and text, and an expandable advertisement 108 contained within an IFRAME 304 of the main page 302. In an example embodiment, the expandable advertisement 108 is hosted from a domain of a third party rich media vendor separate from the content publisher domain. The expandable advertisement 108 may possess an interaction module 310 and a messaging module 312. In an example embodiment, the interaction module 310 monitors for interaction input that triggers the expansion of expandable advertisement 108. Example interactions may include, but are not limited to, a mouse click on the expandable advertisement 108, the rolling of a pointer over a certain portion of the presented webpage, the loading of the advertisement or a predefined event. When an event triggering the expansion of the expandable advertisement 108 occurs the interaction module 310 detects it and initiates a messaging module 312. The messaging module 312 makes a call to an expandable advertisement API 309 which results in the expandable advertisement 108 to expand its display area to 314. In an example embodiment, the call to the expandable advertisement API 309 results in the expansion or collapse of the expandable advertisement, which can be achieved by, for example, acting as an intermediary between the parent page and the expandable advertisement domains to communicate with the parent page domain to resize the IFRAME containing the expandable advertisement, re-rendering of the main page, using third party software such as Adobe Flash or by exposing previously hidden elements.

Figure 4:
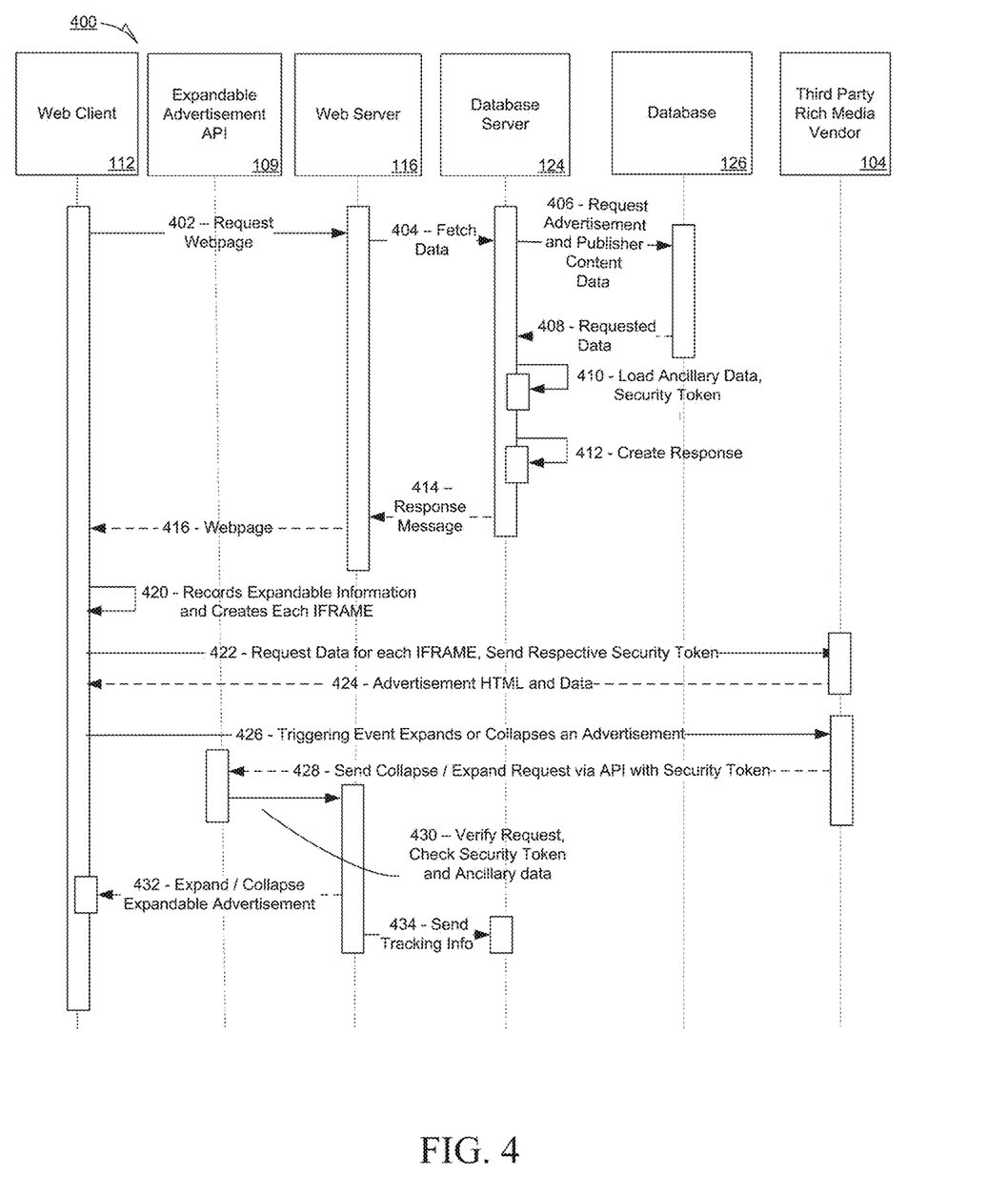
FIG. 4 is an interaction diagram illustrating the expansion of an advertisement, according to an example embodiment.

FIG. 4 is an interaction diagram 400 illustrating the expansion of an advertisement, according to an example embodiment. At operation 402 a web client 112 requests a webpage from a web server 116. In an example embodiment, the request is made using the hyper text transfer protocol and the webpage may include HTML, text, images, and other ancillary information. The web server 116 responds by fetching webpage data at operation 404 in a query to a database server 124. The database server 124 determines the required publisher content and advertisement data and requests the data from a database 126 at operation 406. Elements of the advertisement data may be provided to the content publisher when setting up the advertisement account. At operation 408 the database server 124 retrieves the requested information from the database 126. In an example embodiment, the webpage data, as represented by publisher content and advertisement data, may include content files embodying the content and advertisements, such as HTML, text, images, metadata and other ancillary information and files, such as a security token, as shown in operation 410. The required data is loaded in response to the original database server query at operation 412 and then sent to the web server 116 as a response message at operation 414, where it is transmitted to the web client 112 in the form of an operation transmitting a webpage 416.

In an example embodiment, a security token is a unique identifier identifying an expandable advertisement presented by the third party rich media vendor 104. The security token may be a static constant over time identifying an advertising campaign, a type of advertisement, a rich media vendor or an event or party, or the token may be dynamically generated and identify a particular instantiation of an advertisement. In an example embodiment, a security token may be a string, GUID or file.

At operation 420 the web client 112 analyzes the received webpage data 416 and, if required, creates the IFRAMEs defined in the webpage data. At operation 422, the HTML document embedded in each of the IFRAMEs is requested from a third party rich media vendor 104. In an example embodiment, the webpage data 416 may define multiple expandable advertisements, each hosted by a different third party rich media vendor 104 and each requiring a separate IFRAME. The data request to the third party rich media vendor 104 for each IFRAME may also include the identifying security token, as generated in operation 410. The third party rich media vendor 104 responds at operation 424 by sending advertisement HTML and data to the web client 112 and associates any received security token with a particular instance of the expandable advertisement.

At operation 426 an event or action originating from the web client 112 triggers the expansion or collapse of an expandable advertisement. The third party rich media vendor 104 receives notification of the triggering event and makes a call to an expandable advertisement API 109 to expand or collapse the expandable advertisement at operation 428. In an example embodiment, the security token associated with the expandable rich media advertisement to be expanded or collapsed during the initial generation and fetching of the advertisement IFRAME at operations 410 and 422, is sent with the call to the expandable advertisement API 109. This security token identifies that the party calling the expandable advertisement API 109 to collapse or expand the advertisement is a party associated with the advertisement to be expanded. This security measure prevents parties unassociated with the expandable advertisement from influencing the presentation of the expandable advertisement. In an example embodiment, the third party rich media vendor 104 may also transmit ancillary data with the call to the expandable advertisement API 109. Ancillary data may include metadata information relating to the third party advertisement campaign and the expandable advertisement, such as the type of content provided, the dimensions and direction in which to expand the expandable advertisement and other configuration preferences such as whether expansion is enabled and whether it should be expanded upon loading. The ancillary information transmitted with the call to the expandable advertisement API 109 may then influence the expansion or collapse of the expandable advertisement, such as the dimension or direction, and it may further be verified against ancillary data stored in the database server 124 as an additional security check.

At operation 430 the expandable advertisement API 109 verifies the validity of the expansion request with the web server 116. In an example embodiment, the security token and ancillary data sent by a third party rich media vendor 104 along with the request for expansion/collapse is compared with the data stored in the database 126. If the value of the security token sent with the call to the expandable advertisement API 109 matches the token provided to the third party rich media vendor 104 at operation 422, then the request to expand/collapse is verified. In addition, if ancillary data, such as the shape and dimension of collapse/expansion match or are compatible with the parameters stored in the database 126, the request to expand/collapse is verified.

After verification of the request to expand/collapse at operation 430, the web server 116 transmits data and instructions to expand/collapse the expandable advertisement presented in the web client 112 at operation 432. In an example embodiment, this may be accomplished by, but is not limited to, acting as an intermediary between the parent page and the expandable advertisement domains to communicate with the parent page domain to resize the IFRAME containing the expandable advertisement, re-rendering of the main page, using third party software such as Adobe Flash or by exposing previously hidden elements.

At operation 432 the web server 116 will store to the database 126 tracking information relating to the expandable advertisement. In an example embodiment, tracking may include recording advertisement data on the level of a campaign, placement or message. Tracking metrics may include recording the number of advertisements served, the number of advertisements expanded, the number of advertisements collapsed, each incident of violation with the URL or other data accessible to the expandable advertisement AP.

In an example embodiment, the expandable advertisement API 109 is a partial implementation of the OpenAjax Hub API. The Open Ajax API can be used to tell a parent page to either expand or collapse an IFRAME. In an example embodiment, the parent page determines if a request to expand or collapse the IFRAME follows the specifications defined below. In an example embodiment, a call to the expandable advertisement API requires:

1. A reference to a JavaScript library developed by the content publisher system
2. Parameters which describe the type of expansion or collapse
3. A call to the OpenAjax publish( ) method with the defined parameters The publish( ) method can be called by a third party rich media vendor to both expand and collapse an IFRAME. The third party rich media vendor determines when to tell the parent page to expand or collapse the IFRAME. In an example embodiment, the specified width, height, and direction passed to the expandable advertisement API 109 must match a resolution and expansion direction supported by the content publisher system, which may be stored as predetermined values in the database 126.

In an example embodiment, the expandable advertisement can automatically detect the best direction for expansion based on the higher level page's size, IFRAME location, and where a user has scrolled.

Figure 5:
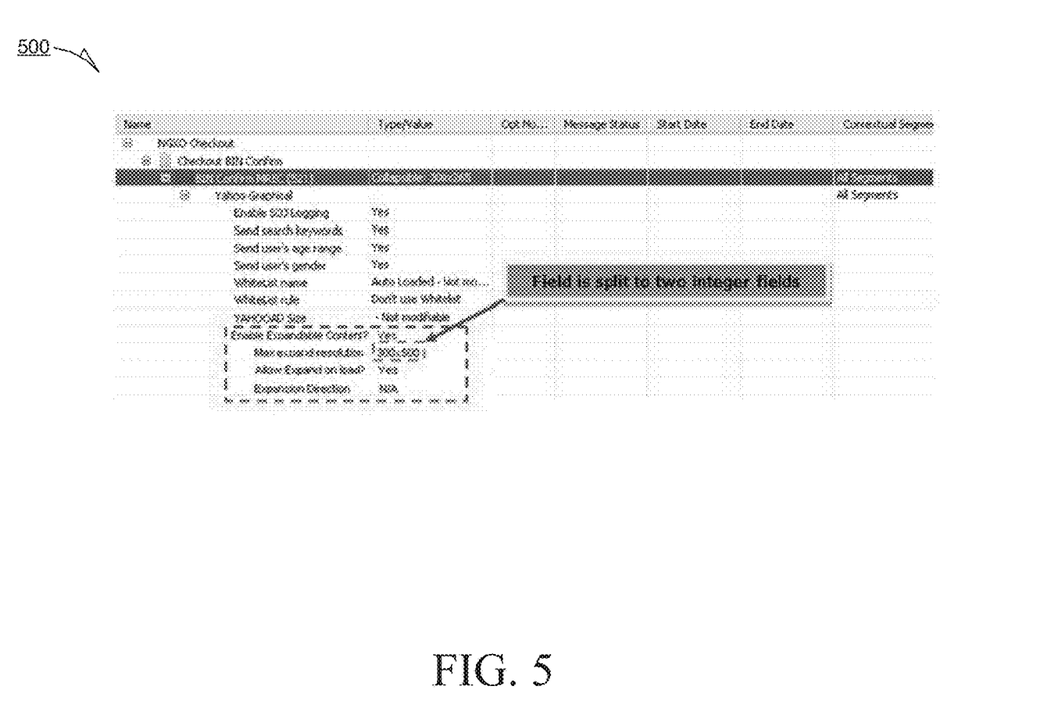
FIG. 5 is a screenshot of ancillary data associated with an expandable advertisement, according to an example embodiment.

FIG. 5 is a screenshot of ancillary data 500 associated with an expandable advertisement, according to an example embodiment. As illustrated, ancillary data may describe logging features, the direction to expand the expandable advertisement, the total dimensions of the expanded and collapsed advertisement, whether to expand the advertisement upon loading and other parameters.

Figure 6:
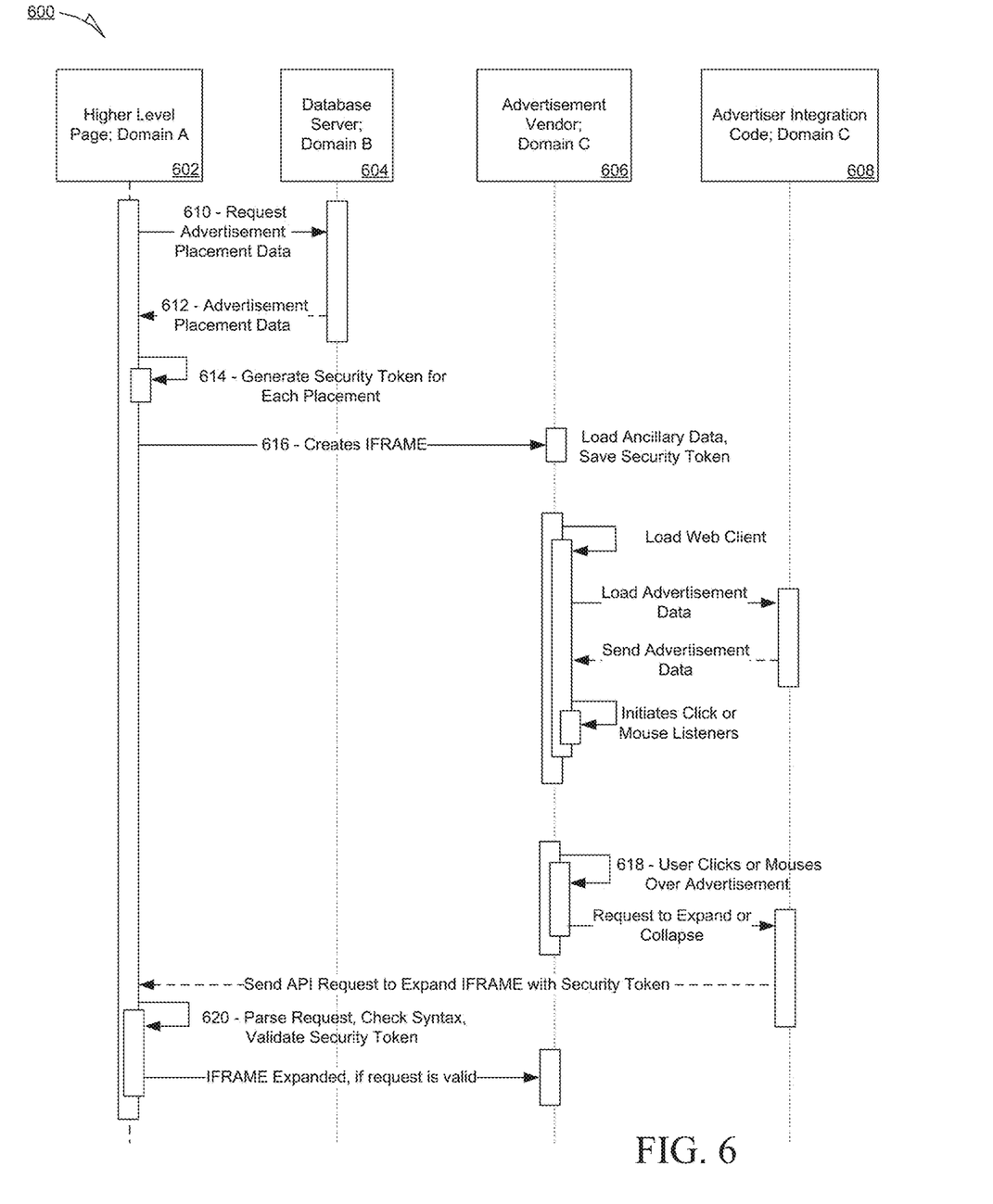
FIG. 6 is an interaction diagram illustrating security procedures, according to an example embodiment.

FIG. 6 is an interaction diagram 600 illustrating security procedures, according to an example embodiment. At operation 610 a higher level page 602 of domain A requests advertisement placement data from a database server of domain B 604. In an example embodiment, both the higher level page 602 and the database server 604 may be operated by the same content publisher. At operation 612 the database server 602 retrieves advertisement placement data and transmits it to the higher level page 602. In an example embodiment, the advertisement placement data may be ancillary data regarding each advertisement placement. At operation 614 a security token is generated for each advertisement. The advertisement vendor 606 receives a call at 616 to fetch advertisement data, such as image and flash files. This call results in the web client loading advertisement data and the initiation of the click and mouse listeners. A trigger event occurs at operation 618 when a click or mouse movement triggers expansion or collapse of an expandable advertisement. This causes advertiser integration code 608, which may be code custom designed to interact with the higher level page 602, to make an API call to expand or collapse the IFRAME which contains the triggered expandable advertisement. The advertiser integration code 608 also may send the security token associated with the expandable advertisement to be expanded or collapsed as verification. At operation 620 the API request is parsed, syntax checked, and the security token validated before the higher level page 602 expands the IFRAME.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
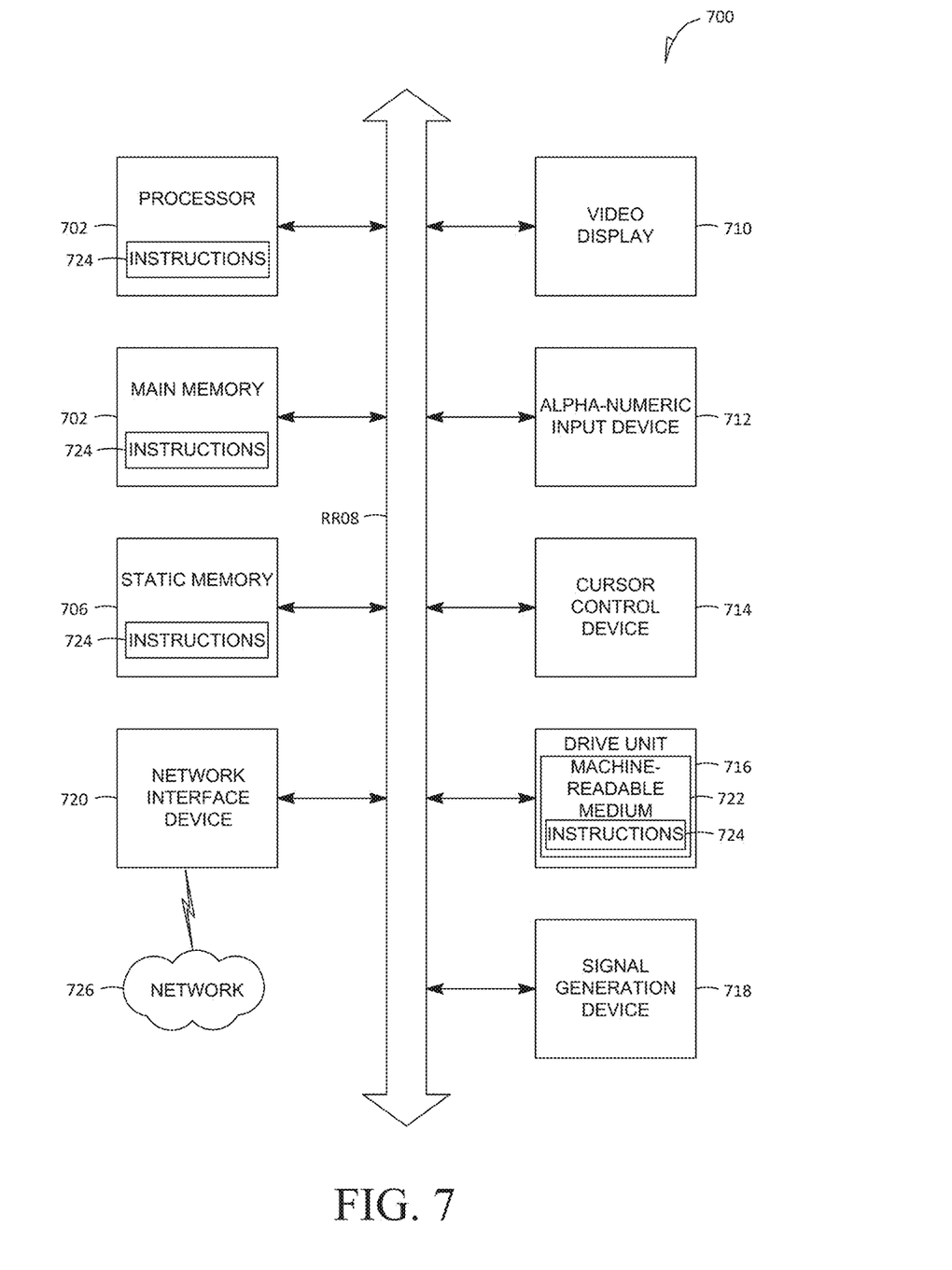
FIG. 7 is a block diagram of a machine in the example form of a computer system within which a set instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more processors; and
   one or more non-transitory machine-readable storage media having instructions stored thereon that, in response to being executed by the one or more processors, cause the system to perform operations comprising:
      communicating, to a client device, webpage data of a webpage in which the webpage data references a rich media advertisement hosted on a third party system that has a different domain than a content publishing system, the webpage data also including a security token that identifies the rich media advertisement and the third party system;
      receiving, from the third party system, an application program interface (API) call that includes the security token and an action instruction regarding performance of an action with respect to the rich media advertisement;
      authenticating the third party system as being authorized to provide instructions regarding the rich media advertisement via the API call based on verifying that the security token identifies the rich media advertisement and the third party system; and
      communicating, to the client device, the action instruction such that the client device performs the action with respect to the rich media advertisement.

2. The system of claim 1, wherein receiving the API call is in response to the third party system receiving a notification of occurrence of a triggering event that occurs at the client device with respect to the rich media advertisement.

3. The system of claim 1, wherein the security token is included in the API call based on the security token being included in a data request for the webpage data that is received by the third party system from the client device and wherein the data request includes the security token based on the webpage data communicated to the client device including the security token.

4. The system of claim 1, wherein the webpage data includes inline frame data that defines an inline frame and that references the rich media advertisement and wherein the webpage includes the inline frame with the rich media advertisement included therein.

5. The system of claim 4, wherein the inline frame data references a Hyper Text Markup Language (HTML) document that references the rich media advertisement.

6. The system of claim 1, wherein the authenticating is further based on ancillary data that is included in the API call and that includes a configuration of the rich media advertisement related to the action.

7. The system of claim 1, wherein the operations further comprise storing tracking information related to performance of the action with respect to the rich media advertisement.

8. One or more non-transitory machine-readable storage media having instructions stored thereon that, in response to being executed by one or more processors of a system, cause the system to perform operations comprising:
   communicating, to a client device, webpage data of a webpage in which the webpage data references a rich media advertisement hosted on a third party system that has a different domain than a content publishing system, the webpage data also including a security token that identifies the rich media advertisement and the third party system;
   receiving, from the third party system, an application program interface (API) call that includes the security token and an action instruction regarding performance of an action with respect to the rich media advertisement;
   authenticating the third party system as being authorized to provide instructions regarding the rich media advertisement via the API call based on verifying that the security token identifies the rich media advertisement and the third party system; and
   communicating, to the client device, the action instruction such that the client device performs the action with respect to the rich media advertisement.

9. The one or more machine-readable storage media of claim 8, wherein receiving the API call is in response to the third party system receiving a notification of occurrence of a triggering event that occurs at the client device with respect to the rich media advertisement.

10. The one or more machine-readable storage media of claim 8, wherein the security token is included in the API call based on the security token being included in a data request for the webpage data that is received by the third party system from the client device and wherein the data request includes the security token based on the webpage data communicated to the client device including the security token.

11. The one or more machine-readable storage media of claim 8, wherein the webpage data includes inline frame data that defines an inline frame and that references the rich media advertisement and wherein the webpage includes the inline frame with the rich media advertisement included therein.

12. The one or more machine-readable storage media of claim 11, wherein the inline frame data references a Hyper Text Markup Language (HTML) document that references the rich media advertisement.

13. The one or more machine-readable storage media of claim 8, wherein the authenticating is further based on ancillary data that is included in the API call and that includes a configuration of the rich media advertisement related to the action.

14. The one or more machine-readable storage media of claim 8, wherein the operations further comprise storing tracking information related to performance of the action with respect to the rich media advertisement.

15. A method comprising:
   communicating, from a content publishing system to a client device, webpage data of a webpage in which the webpage data references a rich media advertisement hosted on a third party system that has a different domain than the content publishing system, the webpage data also including a security token that identifies the rich media advertisement and the third party system;
   receiving, from the third party system, an application program interface (API) call that includes the security token and an action instruction regarding performance of an action with respect to the rich media advertisement;

authenticating the third party system as being authorized to provide instructions regarding the rich media advertisement via the API call based on verifying that the security token identifies the rich media advertisement and the third party system; and communicating, to the client device, the action instruction such that the client device performs the action with respect to the rich media advertisement.

16. The method of claim 15, wherein receiving the API call is in response to the third party system receiving a notification of occurrence of a triggering event that occurs at the client device with respect to the rich media advertisement.

17. The method of claim 15, wherein the security token is included in the API call based on the security token being included in a data request for the webpage data that is received by the third party system from the client device and wherein the data request includes the security token based on the webpage data communicated to the client device including the security token.

18. The method of claim 15, wherein the webpage data includes inline frame data that defines an inline frame and that references the rich media advertisement and wherein the webpage includes the inline frame with the rich media advertisement included therein.

19. The method of claim 18, wherein the inline frame data references a Hyper Text Markup Language (HTML) document that references the rich media advertisement.

20. The method of claim 15, wherein the authenticating is further based on ancillary data that is included in the API call and that includes a configuration of the rich media advertisement related to the action.

* * * * *